July 17, 1928.  1,677,568
L. E. SLAUSON
TRACTION WHEEL
Filed Jan. 14, 1924   2 Sheets-Sheet 1

Inventor:
Louis E. Slauson
By: Wm O. Bell
Atty.

July 17, 1928.

L. E. SLAUSON

TRACTION WHEEL

Filed Jan. 14, 1924

Inventor:
Louis E. Slauson
By: Wm O Belt
Atty.

Patented July 17, 1928.

1,677,568

UNITED STATES PATENT OFFICE.

LOUIS E. SLAUSON, OF ROCK ISLAND, ILLINOIS.

TRACTION WHEEL.

Application filed January 14, 1924. Serial No. 686,050.

My invention relates to a traction wheel and more particularly to a traction wheel having a plurality of traction shoes loosely secured to its rim and adapted to form a track for the rim.

The chief object of my invention is to provide improved means for converting an ordinary smooth rimmed wheel into a traction wheel by applying thereto a plurality of traction shoes adapted to automatically adjust themselves when the wheel revolves, so as to lay a track over which the rim of the wheel will travel smoothly without slippage.

Other objects of my invention will become apparent as the detailed description progresses, reference being had to the accompanying drawings, wherein Fig. 1 is an elevation of a traction wheel embodying the preferred form of my invention.

Similar characters of reference designate similar parts throughout the several views.

Figure 1:
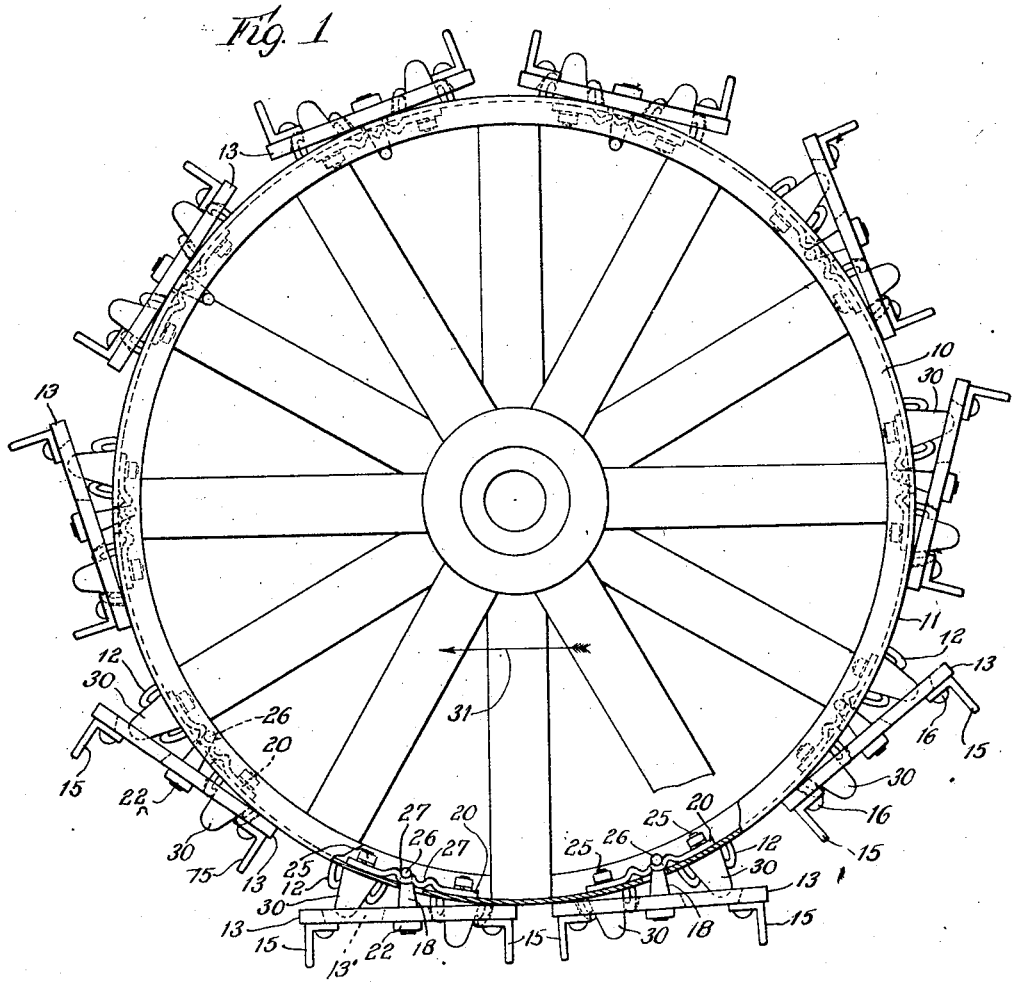

Referring for the present to Fig. 1, the reference character 10 designates in its entirety a metallic traction wheel having a rim 11 which has rigidly secured to its outer face a plurality of teeth 12, the teeth 12 being arranged in pairs. Associated with each pair of teeth 12 is one of a plurality of traction shoes 13. Each traction shoe 13 is loosely secured to the rim of the wheel in a manner hereinafter described and is provided with openings 13′ to receive a pair of teeth and a plurality of driving surfaces 14 at each opening adapted to engage the driving surfaces of the teeth 12. Secured to the outer surface of each of the traction shoes 13 is a plurality of ground engaging bars or grousers 15, rivets 16 being provided for this purpose. This construction permits substitution of other forms of grousers for the type shown in the drawings.

Figure 3:
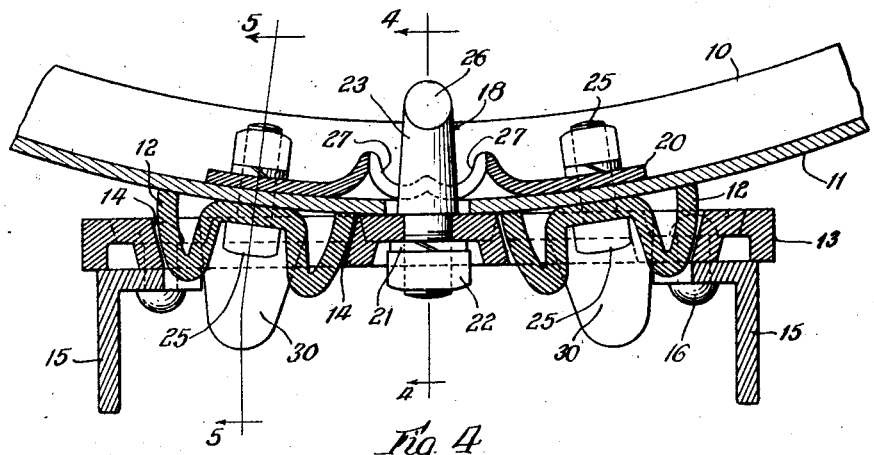
Fig. 3 is a central longitudinal section through the rim of the wheel and it illustrates in detail the construction of the traction wheel and cooperating devices carried by the rim.
Figure 4:
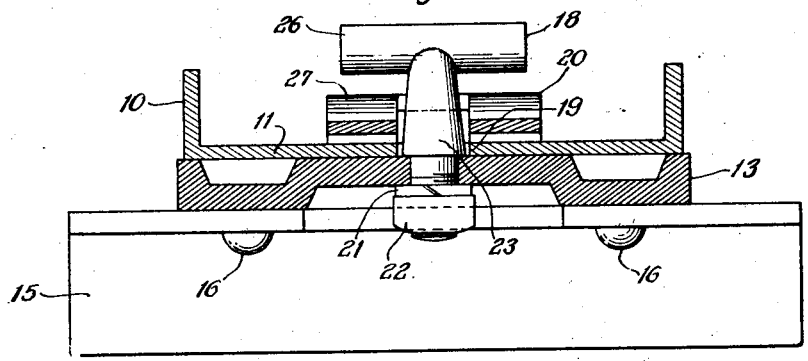
Fig. 4 is a section taken on line 4—4 of Fig. 3.

Each of the traction shoes 13 has rigidly secured to it a T-shaped bar 18 which projects through an aperture 19 in the rim of the wheel and is adapted to engage one of a series of detent members 20 rigidly secured to the inner surface of the rim (Figs. 3 and 4). The means for rigidly securing the T-shaped bar 18 to the traction shoe comprises a lock washer 21 and a nut 22 which is threaded upon a leg 23 of the T-shaped bar. The detent member 20 is rigidly secured to the inner surface of the rim 11 by means of bolts 25 which also serve to rigidly secure the teeth 12 to the outer surface of the rim. The cross bar 26 of the T-shaped bar 18 is adapted to engage either one of a pair of detents 27 formed in the detent member 20.

It is apparent that the traction shoes 13 have considerable freedom of movement with respect to the rim 11 and the teeth 12, with which the shoes are adapted to cooperate. This construction permits the shoes to be presented flatwise to the ground surface in regular spaced position to form a track upon which the rim 11 travels smoothly and evenly, and the ground engaging grousers 15, with which each traction shoe is provided, will not materially injure any surface over which the traction wheel is passing. As the shoes are placed upon the ground surface in spaced position before the wheel, the wheel may travel over pavements without injury thereto, and the grousers may enter and leave soft ground without causing any substantial lateral shifting of the earth.

Figure 5:
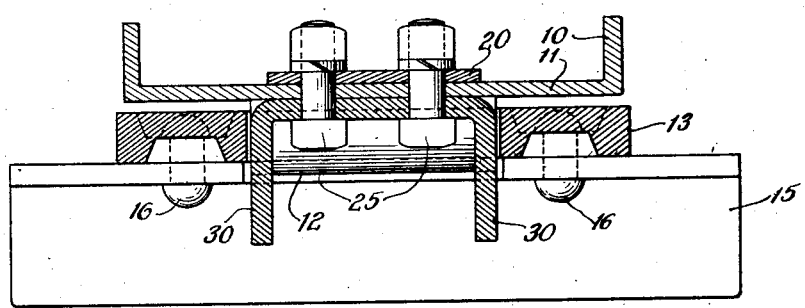
Fig. 5 is a section taken on line 5—5 of Fig. 3.

To keep the traction shoes 13 in alignment with the rim of the wheel the rim is formed with a pair of guide lugs (Fig. 5) having depending lugs 30 projecting through the openings 13′ in the shoe and engaging the sides of said openings. These guide lugs are secured by the bolts 25 to the rim 10 and they are of sufficient length so that when the shoe occupies the several positions relative to the rim 10 shown in Fig. 1, the shoes will at all times be in engagement with the guide lugs, thus insuring the desired alignment with the rim.

Figure 2:
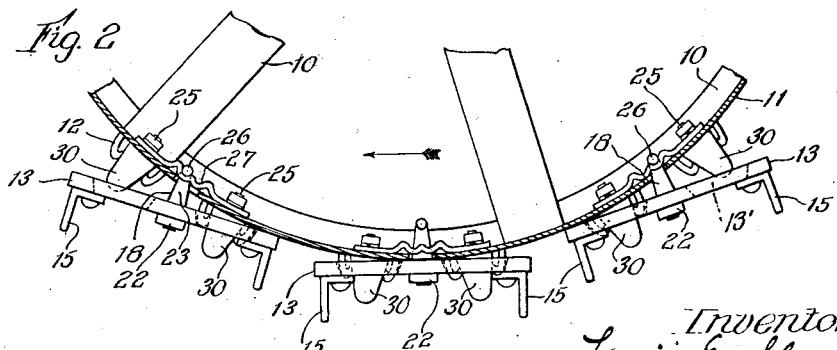
Fig. 2 is a fragmentary elevation of the wheel shown in Fig. 1 illustrating certain positions which the traction shoes take with respect to the rim.

To facilitate the description of the operation of the device, the vehicle of which the traction wheel is a part, will be considered as traveling in the direction indicated by the arrow 31 (Fig. 1). The traction wheel 10 will then revolve in a counter clockwise direction (Fig. 1) and as the traction shoes 13 are lowered to the ground surface in front of the traction wheel the cross bar 26 of each T-shaped bar 18 will occupy or engage the upper one of the pair of detents 27 associated with any particular traction shoe 13 holding the shoe in one of the positions indicated to the left in Figs. 1 and 2. While the traction shoes 12 are resting upon the ground surface, and while the rim 11 of the wheel is passing over them their cross bars 26 will leave the detents 27 so that the driving surface 14 on the traction shoes may operatively engage the teeth 12 of the rim. But as the wheel passes from any one of the traction shoes, its cross bar 26 will engage a detent 27, the detent 27 thus engaged being the remaining detent of the pair engaged while the shoe was being lowered to the ground surface in front of the wheel. The traction shoe is then carried upwardly by the wheel 10 in the manner and in the positions with respect to the rim illustrated to the right in Figs. 1 and 2. As each of the shoes 13 passes over the top of the wheel, its cross bar 26 is disengaged from the detent member 20, coming into engagement again with the upper detent of each pair of detents as described above, and as shown to the left in Figs. 1 and 2.

I am aware that changes in the form, construction and arrangement of parts may be made without departing from the spirit and without sacrificing the advantages of the invention, and I reserve the right to make all such changes as fairly fall within the scope of the following claims.

I claim:

1. The combination with the rim of a wheel, the rim being apertured, of teeth on the outer face of the rim, a detent member on the inner face of the rim, a traction shoe cooperatively engaged with the teeth of the rim, and means carried by the shoe and projecting through the rim to engage the detent member to hold the shoes in a plurality of positions relative to the teeth on the rim.

2. The combination with the rim of a wheel, of teeth on the outer faces of the rim, a detent member on the inner face of the rim, and a traction shoe having openings to receive said teeth, and means to engage the detent member to loosely secure the shoe to the rim so that it may have freedom of bodily movement radially or peripherally of the wheel within limits determined by the teeth and the detent member.

3. The combination with the rim of a wheel, of teeth on the outer surface of the rim, a plurality of detents on the inner surface of the rim, a traction shoe having openings to receive said teeth, and means secured to the shoe and adapted to engage one of the detents when the shoe is in one position relative to the teeth and the other of the detents when the shoe is in a different position relative to the teeth.

4. In combination, a rim of a wheel, said rim having an aperture therein, a traction shoe having a bar extending through said aperture, and means on said rim cooperating with said bar to hold said shoe in a plurality of positions relative to the rim, said means comprising a plurality of detents arranged in alignment circumferentially of the rim and shaped to receive said bar.

5. In combination, a rim of a wheel, said rim having an aperture therein, a pair of detent members on the inner face of said rim on either side of said aperture and extending circumferentially of said rim, a traction shoe adapted to contact with the outer face of the rim and having a T-bar extending through said aperture and cooperating with said detent members to hold said shoe in a plurality of positions.

LOUIS E. SLAUSON.